(12) United States Patent
Baba et al.

(10) Patent No.: US 6,694,882 B2
(45) Date of Patent: Feb. 24, 2004

(54) HOLOGRAPHIC STEREOGRAM PRINTING APPARATUS AND A METHOD THEREFOR

(75) Inventors: Shigeyuki Baba, Tokyo (JP); Akira Shirakura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/149,724

(22) PCT Filed: Oct. 16, 2001

(86) PCT No.: PCT/JP01/09078

§ 371 (c)(1),
(2), (4) Date: Aug. 30, 2002

(87) PCT Pub. No.: WO02/33494

PCT Pub. Date: Apr. 25, 2002

(65) Prior Publication Data

US 2003/0106451 A1 Jun. 12, 2003

(30) Foreign Application Priority Data

Oct. 16, 2000 (JP) ......................................... 2000-315969

(51) Int. Cl.[7] .................................................. B41F 1/54
(52) U.S. Cl. ........................... 101/483; 359/9; 359/462; 345/419
(58) Field of Search ........................... 101/483; 400/61; 348/42; 359/462, 470, 9, 22–26, 906; 345/419, 422

(56) References Cited

U.S. PATENT DOCUMENTS

| | | | | | |
|---|---|---|---|---|---|
| 4,206,965 A | * | 6/1980 | McGrew | ......................... | 359/9 |
| 4,783,133 A | * | 11/1988 | Chen | ........................... | 359/23 |
| 5,194,971 A | * | 3/1993 | Haines | ......................... | 359/9 |
| 5,237,433 A | * | 8/1993 | Haines | ......................... | 359/9 |
| 5,594,841 A | * | 1/1997 | Schutz | ......................... | 359/462 |
| 5,757,522 A | * | 5/1998 | Kulick et al. | .................. | 359/9 |
| 6,191,808 B1 | * | 2/2001 | Katayama et al. | ............. | 348/42 |
| 6,239,809 B1 | * | 5/2001 | Morioka et al. | ............. | 345/422 |
| 6,366,281 B1 | * | 4/2002 | Lipton et al. | ................ | 345/419 |
| 6,393,144 B2 | * | 5/2002 | Rogina | ....................... | 382/154 |

FOREIGN PATENT DOCUMENTS

| | | | |
|---|---|---|---|
| EP | 816951 | * | 1/1998 |
| EP | 932088 | * | 7/1999 |
| JP | 11-202746 | * | 7/1999 |

* cited by examiner

Primary Examiner—Eugene H. Eickholt
(74) Attorney, Agent, or Firm—Jay H. Maioli

(57) ABSTRACT

A holographic stereogram printing system capable of printing a holographic stereogram by selectively performing a desired image processing on a still picture image or a motion picture image entered. The printing system is comprised of an image processing server for selectively performing an image processing on an image data, an image storage server for storing the image data processed in the image processing server, and a printing device for printing a holographic stereogram in accordance with the processed image data stored in the image storage server.

6 Claims, 11 Drawing Sheets

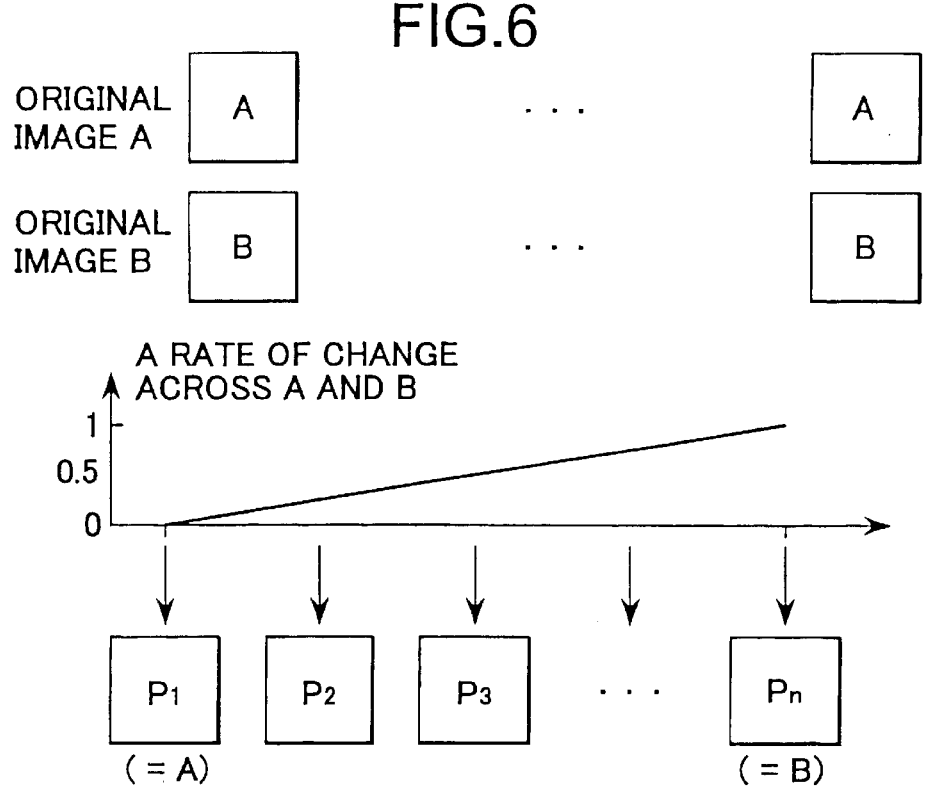
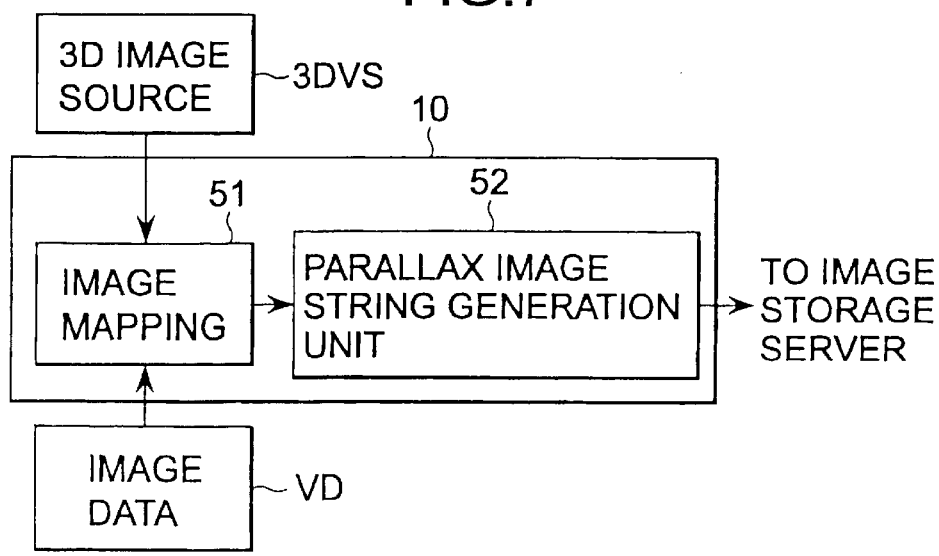

FIG.8
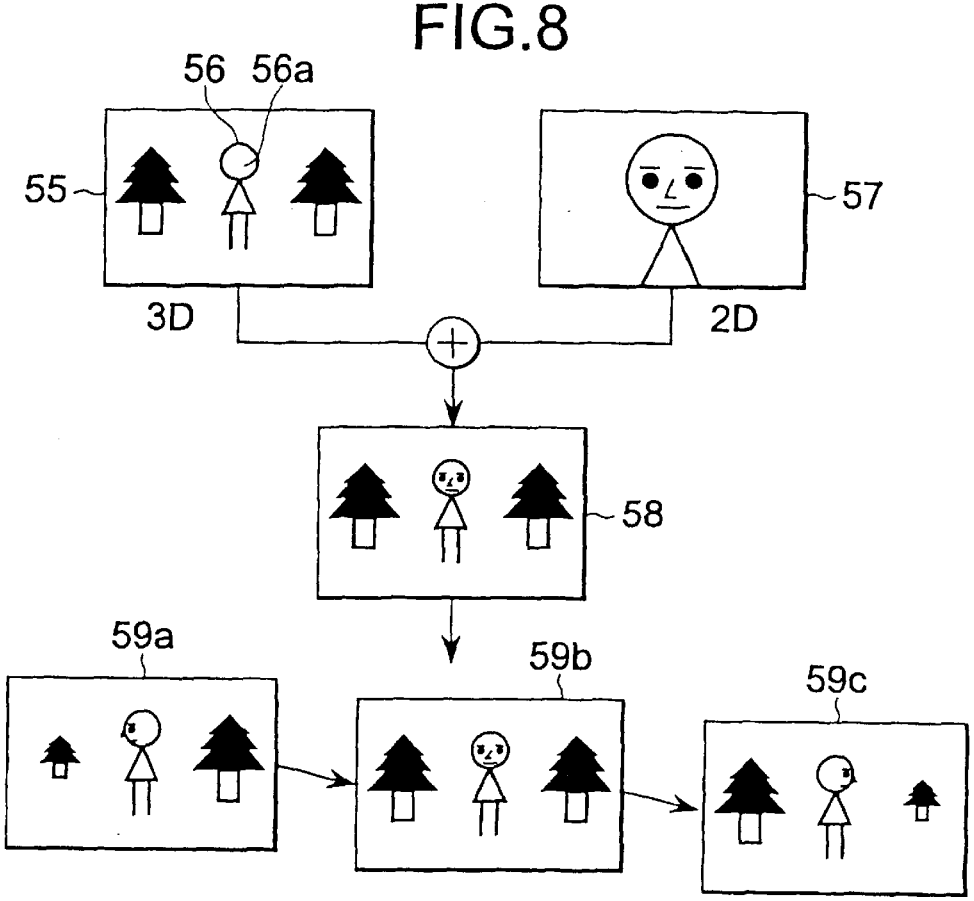
FIG.9
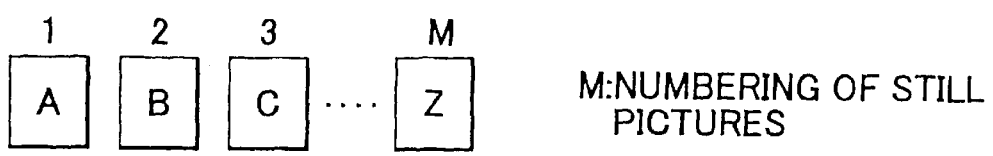
M:NUMBERING OF STILL PICTURES
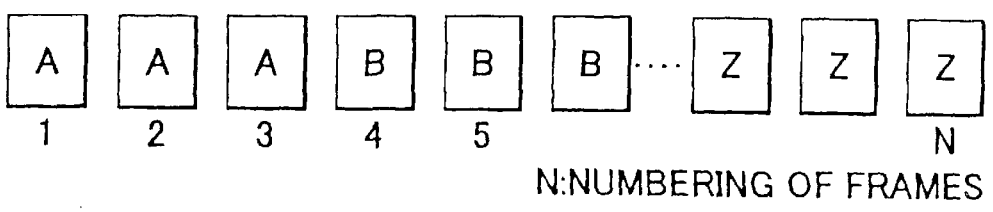
N:NUMBERING OF FRAMES

HOLOGRAPHIC STEREOGRAM PRINTING APPARATUS AND A METHOD THEREFOR

CROSS REFERENCE TO RELATED APPLICATION

This application claims priority to Japanese Patent Application No. JP 2000-315969, and the disclosure of the application is incorporated herein by reference to the extent permitted by law.

TECHNICAL FIELD

The present invention relates to a holographic stereogram printing apparatus and a method for forming a holographic stereogram.

BACKGROUND ART

A holographic stereogram is formed using a plurality of images of an object which are taken sequentially from different viewing points as its original images, then recorded as hologram elements in the form of strips or dots on a single hologram recording medium.

For example, when forming a holographic stereogram having parallax information only in a horizontal direction, first of all, a plurality of images of an object 201 are sequentially taken from different viewing points in the horizontal direction to obtain a string of parallax images 202 having the plurality of images having horizontal parallax information, as shown in FIG. 14. Then, each image 203 which constitutes the string of the parallax images 202 is recorded sequentially and consecutively in the horizontal direction as a hologram element (element hologram) in a strip form on a hologram recording medium 200. Thereby, the holographic stereogram which has parallax information to the horizontal direction is obtained.

In this holographic stereogram, since each information of the plurality of images 203 taken sequentially from the different viewing points in the horizontal direction is recorded sequentially as the hologram element in the strip form consecutively in the horizontal direction, when a viewer observes this holographic stereogram with both eyes, each 2-dimensional image for each of the both eyes of the user to see appears different from each other. Thereby, the viewer perceives a parallax image, hence reproducing a 3-dimensional image. Heretofore, it has been considered for the hologram recording medium that it records only the 3-dimensional image.

DISCLOSURE OF THE INVENTION

At present, in order to reproduce a motion picture, it is necessary to have special equipment, such as a video player, a projector or the like, which includes electronic circuits. Therefore, it has been not so easy to carry a motion picture and reproduce it with this equipment. Further, when carrying a plurality of still pictures, it has been necessary to carry them as a plurality of photographs, printed images, or holding them in an album.

Further, it has been difficult to operate image-processing applications for printing a plurality of still pictures and for printing motion pictures on a same system.

Therefore, it has been desired to provide for a novel holographic stereogram printing apparatus and a method capable of performing various image processing selectively as desired by a user on a still image and/or a motion image entered by the user and printing a holographic stereogram accordingly.

A holographic stereogram printing apparatus according to an aspect of the present invention comprises: an image processing unit for generating a string of picture images after selectively performing an image processing onto a still picture image entered, and a viewing point processing onto the string of these picture images; an image storage unit for storing therein a processed picture image output from the above-mentioned image processing unit; and a printing unit for generating and printing a holographic stereogram in accordance with the processed picture image read out from the image storage unit.

A holographic stereogram printing apparatus according to another aspect of the present invention comprises: an image processing unit for generating a string of picture images after selectively performing an image processing to a motion picture image entered, and a viewing point conversion processing onto the string of picture images; an image storage unit for storing therein a processed picture image output from the above-mentioned image processing unit; and a printing unit for generating and printing a holographic stereogram in accordance with the processed picture image read from the image storage unit.

A holographic stereogram printing method according to an aspect of the present invention comprises: an image processing step of generating a string of picture images by selectively performing an image processing on a still picture image entered, and a viewing point conversion processing on the string of these picture images; an image storing step of storing in an image storage unit the picture image processed at the above-mentioned image processing step; and a printing step of producing a holographic stereogram in accordance with the processed image stored at the image storing step.

A holographic stereogram printing method according to another aspect of the present invention comprises: an image processing step of generating a string of picture images by selectively performing an image processing onto a motion picture image entered, and applying a viewing point conversion processing to the string of these picture images; an image storing step of storing the picture image processed at the image processing step; and a printing step of producing a holographic stereogram in accordance with the processed image stored in the image storing step.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 6 is a diagram for explaining the morphing process more specifically;

FIG. 7 is a block diagram indicating a function of the image processing server when the same executes a texture mapping process application software according to a first embodiment of the present invention;

FIG. 8 is a schematic diagram illustrating an example of processing by the image processing server when the texture mapping process application software is executed according to the first embodiment of the invention;

FIG. 9 is a diagram illustrating a short album processing to be executed by a short album processing application software;

BEST MODE FOR CARRYING OUT THE INVENTION

A preferred embodiment of the present invention will be described in the following by referring to the accompanying drawings. According to the preferred embodiment of the invention, in a holographic stereogram printing system for printing a holographic stereogram, an appropriate image processing which the user desires is applied to a still picture images or a motion picture image which a user already has. Then, an output of thus processed image is read out via the image storage server to be printed as a holographic stereogram. This holographic stereogram printing system is capable of producing the holographic stereogram after executing a software program of a holographic stereogram printing process according to the invention.

Figure 1:
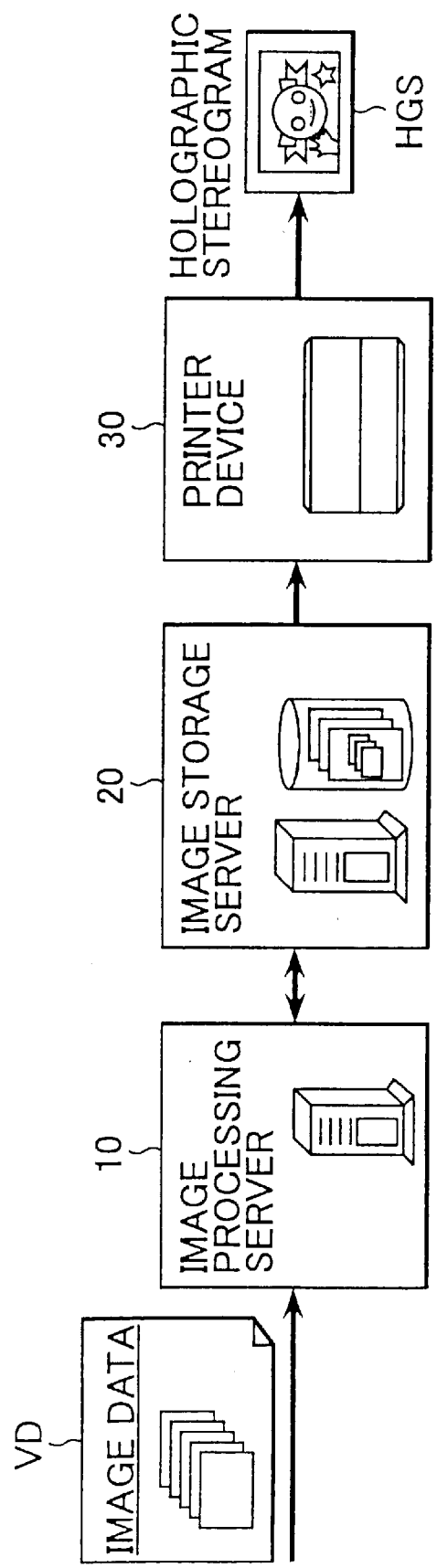
FIG. 1 is a schematic block diagram indicating a configuration of a holographic stereogram printing system according to an embodiment of the present invention.

As shown in FIG. 1, this holographic stereogram printing system of the invention comprises: an image processing server 10 which performs selectively an appropriate image processing on an image data (video data) VD so as to generate a series (string) of images, and applies a viewing point conversion processing to this string of images; an image storage server 20 for storing therein thus processed images processed at the image processing server 10; and a printer device 30 for producing a holographic stereogram (HGS) in accordance with the processed image read-out from the image storage server 20. The image processing server 10, the image storage server 20 and the printer device 30 may be arranged to be integrated in a single body or may be provided separately. For example, there may be a case where the image processing server 10 and the image storage server 20 are provided at a certain place or places close to each other and the printer device 30 is separately provided. In specific, a case where the image data processed and stored in the servers is transmitted via the Internet, for example, to a remotely accessible printer device so as to be printed out is also possible.

Figure 2:
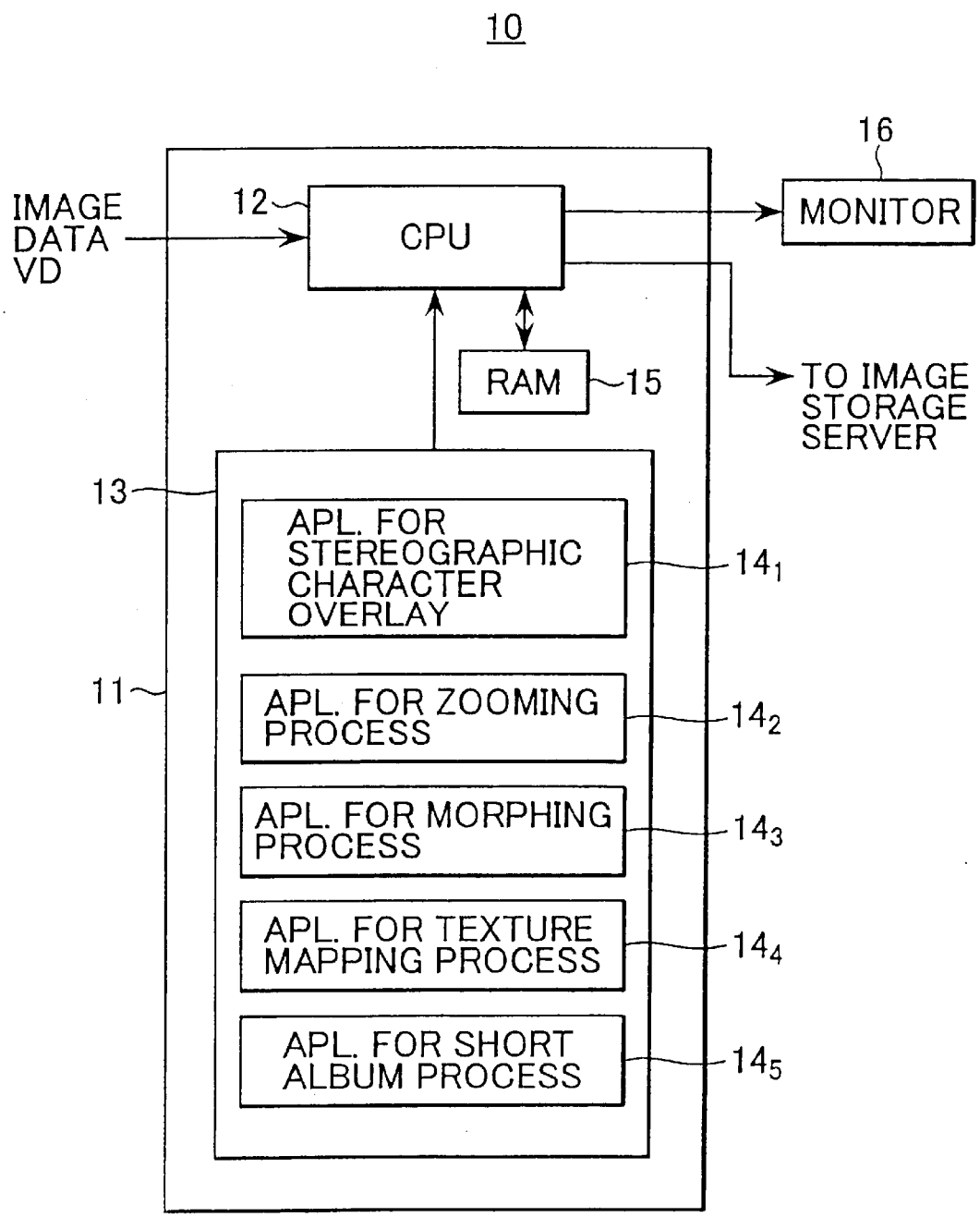
FIG. 2 is a block diagram indicating an internal arrangement of an image processing server which makes up the holographic stereogram printing system of the present invention.

The image processing server 10 has an image processing computer section 11 for performing an appropriate image processing on a still picture image or a motion picture image which have been entered, and a monitor 16 as shown in FIG. 2.

The image processing computer section 11 includes: a central processing unit (CPU) 12 which executes a desired image processing in response to an instruction from the user via another computer which is not shown; an application software storage unit 13 in which a plurality of image processing application software are stored; and a RAM 15 serving as a work area for these image processing.

In the application software storage unit 13, there are stored a stereogram character overlay application software $14_1$, a zooming process application software $14_2$, a morphing process application software $14_3$, a texture mapping process application software $14_4$, and a short album process application software $14_5$.

The stereogram character overlay application software $14_1$ which is a program for overlaying or superimposing a stereogram (stereoscopic) character on image data VD is selected by the user and executed in the CPU 12.

Figure 3:
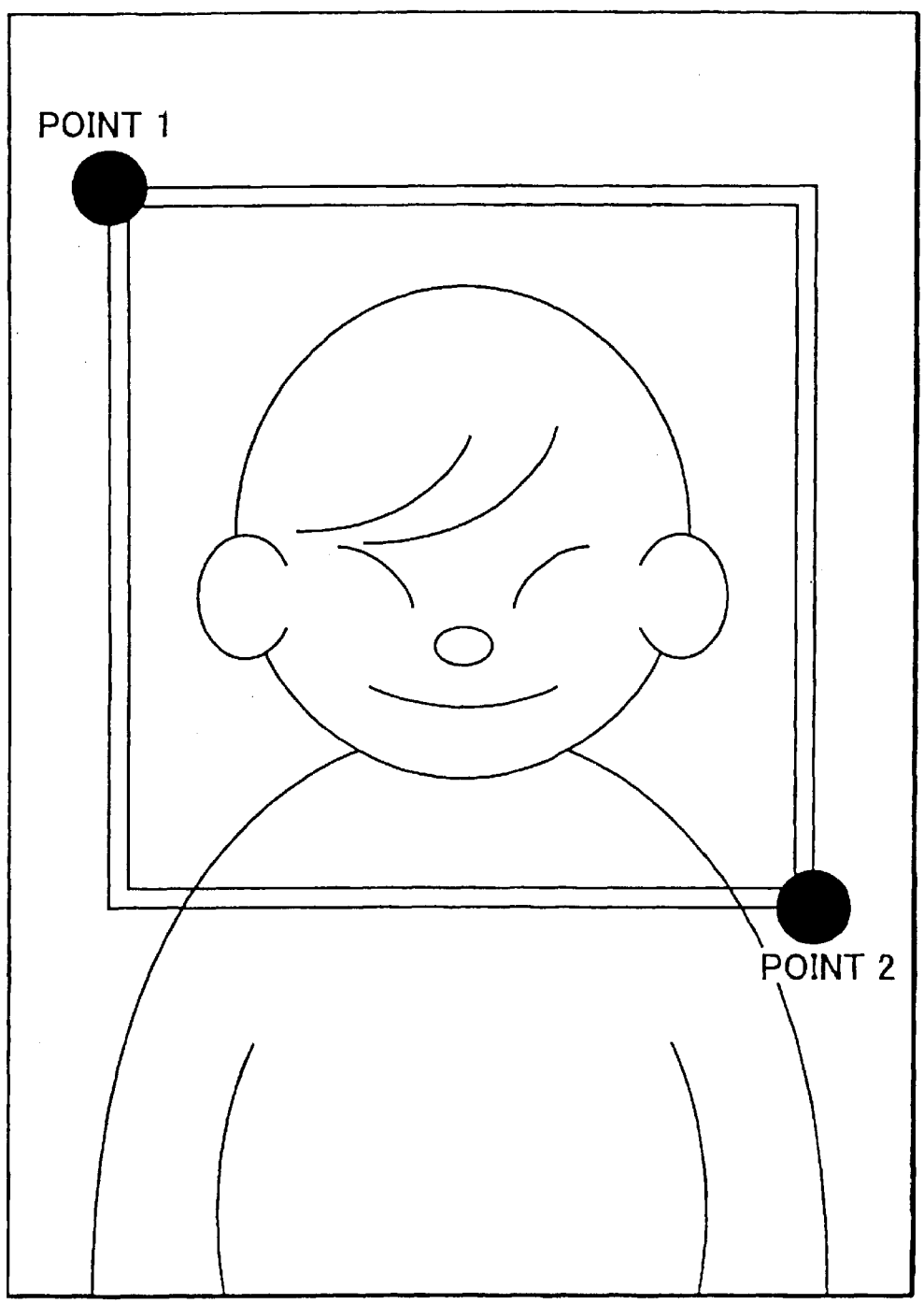
FIG. 3 is a schematic diagram showing a manner in which an area designation data is entered by a user.

The zooming process application software $14_2$ is a program enabling for a specific area designated by the user in the image data VD to be zoomed gradually responsive to an area designation data entered by the user. The area designation data for zooming is provided by selecting two points (point 1 and point 2 on diagonal corners) which define an area to be zoomed as shown in FIG. 3 on a zoom area designation screen displayed on the monitor 16.

Figure 4:
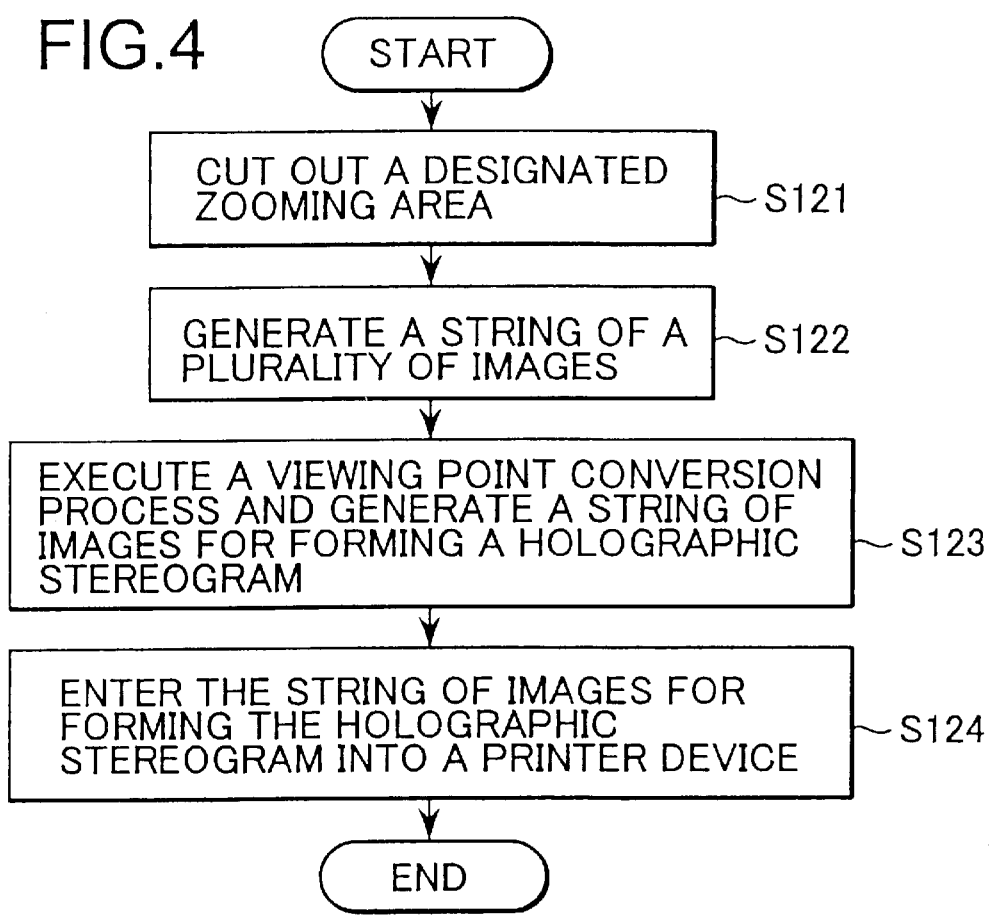
FIG. 4 is a flowchart for explaining a zooming process application software.

By referring to a flowchart in FIG. 4, a system operation when the CPU 12 executes the zooming process application software $14_2$ in response to the selection thereof by the user will be described in the following. Firstly, in step S121, the image processing server 10 cuts out a zooming area designated by the area designation data from the image data VD. Then, in step S122, a string of plural picture images is formed to be able to gradually zoom in/out the designated area. In step S123, a viewing point conversion processing to be described later is applied to these plural images with time-spatial parameters so as to generate a string of images for forming a holographic stereogram. When this string of images having undergone the viewing point conversion processing for forming the holographic stereogram is entered via the image storage server 20 into the printer device 30 in step S124, a holographic stereogram in which its image can be observed as zooming gradually with a change in the viewing points is produced.

Figure 5A:
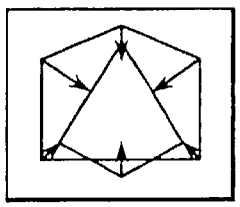
FIGS. 5A and 5B are diagrams each for explaining a morphing process to be executed by a morphing process application software.
Figure 5B:
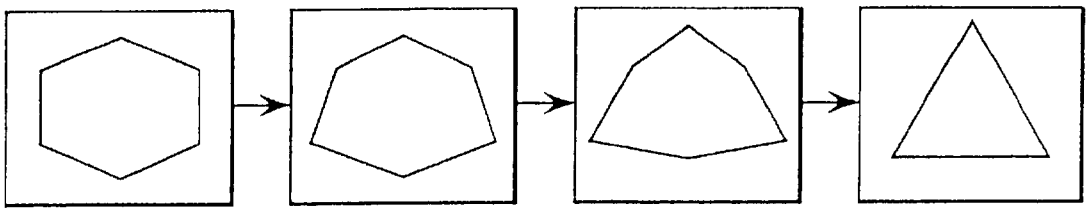

Next, the morphing process which is realized by executing the morphing process application software $14_3$ will be described. The morphing is a technique used when a certain image is changed from its original image to a different image to allow its change to appear as if taking place gradually by filling in spatial blanks between these images. Namely, for example, when a hexagonal image shown in FIG. 5A changes into a triangular image, some intermediate images are interpolated therebetween by the morphing processing as shown in FIG. 5B such that its change in the images appears to progress gradually.

In this morphing process, an image string (a series of images), each image having a different rate of change, can be obtained by varying a rate of change which is used to multiply a moving vector between two images. For example, in a morphing process of two original planar images A and B as shown in FIG. 6, by varying its rate of change between 0 and 1, an image string P having a plurality of images can be generated. Here, as for an image P1 and an image Pn, it is assumed that the former corresponds to a case where its rate of change is zero and is identical with the original image A, and the latter corresponds to a case where its rate of change is 1 and is identical with the original image B. By recording these images of the image string P on a hologram recording medium, it becomes possible to observe a planar image with its morphing changing depending on its viewing point. In this planar image, if observed, for example, from the left side thereof, the original image A is observed, then its form changes with a movement of a viewing point to the right side, and when observed from the right side, the original image B is observed.

In the manner described above, according to the morphing process, the image string comprising a plurality of intermediate images showing a gradual change can be produced from the two original images. Through execution of the morphing process application software $14_4$ in the CPU 12, the image processing server 10 is enabled to generate an image string comprising a plurality of intermediate images from two original picture images entered by the user. Then, after having performed the viewing point conversion processing on these images of the image string including the sequence of images, these images are stored once in the image storage server 20, and printed on a hologram recording medium by the printer device 30, such that a holographic stereogram having a morphing effect to change gradually depending on its viewing direction as described above is accomplished.

Next, the texture mapping process which is realized by executing the texture mapping process application software $14_4$ will be described. The texture mapping process is an image processing for synthesizing a still picture image data VD supplied from the user with a stereographic image model prepared in advance to constitute at least part of a 3-dimensional object. In order to perform this texture mapping process, the image processing computer section 11 in the image processing server 10 enables the CPU 12 to execute the texture mapping process application software $14_4$. FIG. 7 shows a function block diagram indicating an internal arrangement of the image processing server 10 when executing the texture mapping process. Namely, this image processing server 10 functions as if it has an image mapping portion 51 and a parallax image string generation portion 52 when enabled by execution of the texture mapping process application software $14_4$, in order to synthesize an image of a 3-dimensional object prepared in advance by a 3-D image source 3DVS and picture image data VD entered by the user, then to generate from this synthesized image a parallax image string which includes a plurality of images to be multiplexed into a holographic stereogram.

The image mapping portion 51 synthesizes two-dimensional image VD with a 3-dimensional object image from the 3-D image source 3DVS and a stereogram model which constitutes at least a part thereof. The parallax image string generation portion 52 performs a rendering process and the like onto a synthesized image from the image mapping portion 51 so as to generate a string of parallax images. The 3-D image source 3DVS stores 3-dimensional images of computer graphics (CG) and/or actually shot stereogram.

Operation of the image processing server 10 the function of which has been indicated in FIG. 7 will now be described with reference to FIG. 8.

Firstly, a three-dimensional (3-D) image 55 from the 3-D image source 3DVS and a 2-dimensional image VD with a reference numeral 57 are synthesized in the image mapping portion 51. At this time, in the 3-D image 55, there is formed a stereogram model 56 of a person which has a face 56a as a three-dimensional (3-D) polygon model without provision of countenance or a facial expression devoid of eye brows, eyes, nose, mouth and the like. The 2-dimensional image 57 which has the facial expression such as the eyebrows, eyes, nose, mouth and the like is synthesized with the 3-D polygon model of the face 56a. As a result, a synthesized image 58 in which the 3-D polygon model 56a in the 3-D image is synthesized with the 2-D image 57 is obtained. On the synthesized image 58, the parallax image string generation portion 52 performs a rendering processing, a rearrangement processing and the like so as to generate a parallax image string comprising images 59a, 59b and 59c to be multiplexed into a holographic stereogram. That is, the image processing server 10 of the present invention, upon execution of the texture mapping application software $14_4$, generates the parallax image string and after synthesizing the 3-D image with the 2-D still image and performing the rendering processing on the whole area.

As described above, the image processing server 10 which executes the texture mapping process application software $14_4$ is enabled to generate the parallax image string by pasting the still picture image VD or the like on the stereogram model such as the polygon model and thus mapping the planar image and the stereogram image, without use of a special imaging method.

A series of image data constituting the parallax image string after having been applied with the viewing point conversion processing are displayed sequentially on a display unit 111 of the printer device 30 to be described later (See FIG. 13). Then, a light exposure shutter 102 is opened for each of these images, and its respective image is recorded sequentially on a hologram recording medium 100 as an element hologram in the form of a strip.

Now, the short album processing which is realized by executing the short album processing application software $14_5$ will be described with reference to FIG. 9. The short album processing is used for generating a series of consecutive frames of images from a respective frame of a still picture image. That is, the picture image which the user entered is copied to have a predetermined number of picture images. For example, the still picture images from A, B, C, - - - to Z in frames 1, 2, 3, - - - to M as shown in FIG. 9 are processed in the following manner. In specific, the still picture image A is copied to be three pieces which are to be in three consecutive frames 1, 2, 3; and similarly, the still picture image B is copied to be three pieces which are to be in three consecutive frames 4, 5, 6; and finally the still picture image Z is copied to be three pieces which are to be in three consecutive frames of N-2, N-1 and N. In this way, a plurality of still picture images can be displayed as if they are in an album. In this case, whether or not still picture images are used as frame images, a sequential order of its display, a timing of switching of the images and so on can be designated by the user. Through execution of this short album processing application software $14_5$ by the CPU 12, the image-processing server 10 is enabled to generate a string of images that constitute the album from the still picture images VD which the user has entered.

The image storage server 20 will be described more specifically in the following. The image storage server 20 has: an image computer portion for executing an overall control when storing various types of processed image data generated in the image processing server 10 and generating various related data; and an image database portion for storing various information on the storage of the image data as a database.

The image computer portion receives the image data which has been processed in accordance with the various image processing in the image processing server 10, and stores the processed image data in the image data base portion such as a hard disk drive or the like having a large recording capacity. Further, the image computer portion has various other image data such as those generated by computer graphics (CG) stored in the image database portion, in addition to the above-mentioned processed image data. Namely, the image computer portion enables for the 3-D images and even front/background image data in addition to the image data processed by the image processing server to be stored in the image database portion. Further, the image computer portion generates various information on these image data indicating the contents thereof in association with the various types of the processed image data which have been stored, supplies this information to the image database portion to be stored therein. Still further, the image computer portion, in response to a control signal of an image request sent from the printer device 30, reads out the requested processed image data from the image database portion, and supplies this read-out processed image data to the printer device 30.

The image database portion which is provided with a large capacity recording medium such as a hard disk drive or the like stores, under control of the image computer portion, the processed image data and various related information associated therewith generated by the image computer portion as its database.

Now, the viewing point conversion processing to be executed in the image processing server 10 will be described. The image string generated by execution of the above-mentioned image processing in the image processing server 10 needs to be applied with the viewing point conversion processing.

Figure 10A:
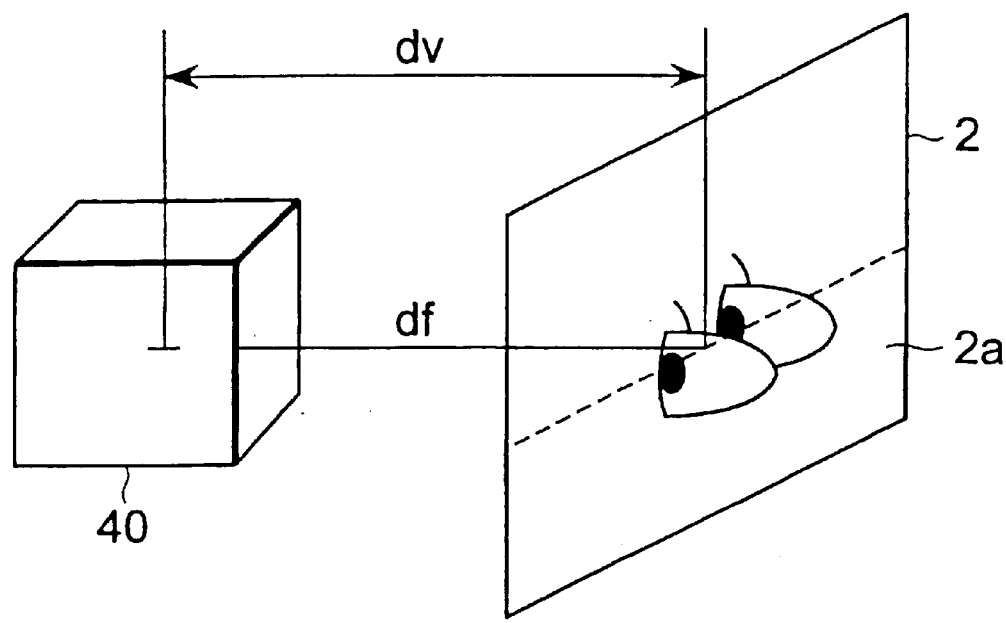
FIGS. 10A and 10B are schematic diagrams each illustrating a viewpoint conversion processing to be applied to a string of parallax images.

By the way, in a holographic stereogram 2, there occurs such a phenomenon that, as shown in FIG. 10A, a reproduced image 40 of a hologram recorded image becomes gradually distorted as the viewing point moves farther from a hologram surface 2a. Further, with regard to the white light reproduced holographic stereogram, a blur of the image substantially decreases the closer the reproduced image 40 is constantly located to the hologram surface 2a. The above-mentioned phenomenon of the distortion is caused due to a fact that a positional relation between an image shooting point of a camera for shooting the parallax image string and the object P, namely, a shooting distance df, is maintained also with regard to the reproduced image 40 reproduced from the holographic stereogram 2 which was produced by the holographic stereogram producing apparatus, thereby resulting in the deviation due to a difference between the viewing point and the image shooting point.

Namely, in the holographic stereogram 2, if a parallax image string data based on the parallax image string is supplied directly as they are, without applying the viewpoint conversion processing described later, as a light exposure image data to the printing unit so as to generate a light exposure image, and if a hologram record image is produced by exposure and recording on a hologram recording medium in accordance with this light exposure image, its reproduced image 40 appears to be focused at a point deviated deeper by the shooting distance df relative to the hologram surface 2a as shown in FIG. 10A. Therefore, for the holographic stereogram 2, it is necessary in order to obtain a good reproduced image 40 in an excellent state without any distortion and/or blur that it must be used in such a condition with the eyes of the user positioned on the hologram surface 2a as shown in FIG. 10A so that its viewing distance dV coincides with the shooting distance df of the parallax image string. However, this is not practical.

When performing the image data processing on the parallax image string information based on the parallax image string in the image processing server 10, the viewing point conversion processing is performed such that its reproduced image 40 is positioned constantly in the vicinity of the hologram surface 2a of the holographic stereogram 2, and then its light exposure image data is produced. As to the holographic stereogram 2, its hologram recording image is exposed and recorded on the hologram recording medium with an object laser beam and a reference laser beam, being modulated by the light exposure image displayed on a liquid crystal display in accordance with the light exposure image data subjected to the viewing point conversion processing described above.

Figure 10B:
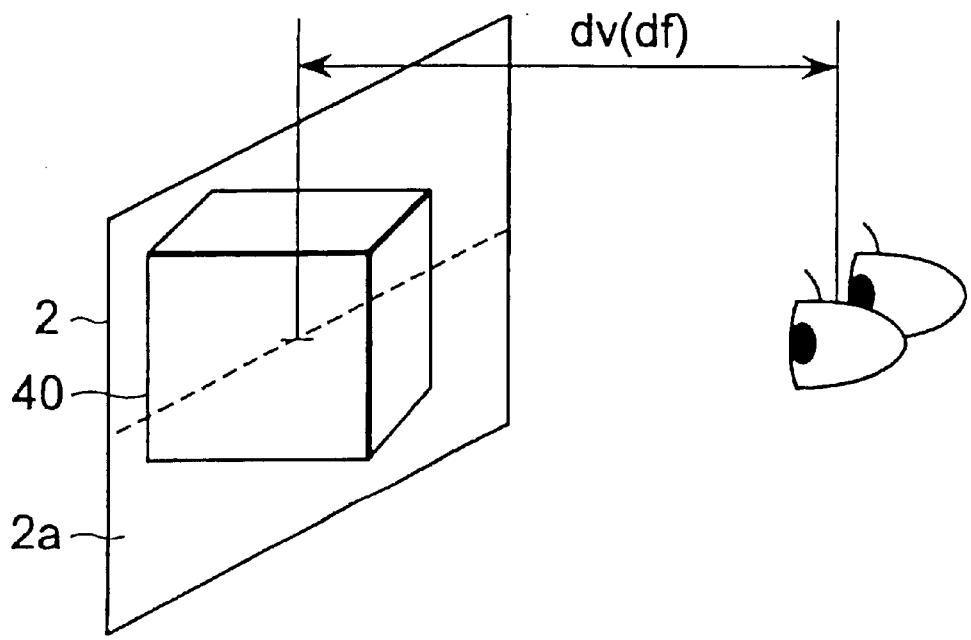

Thereby, in this holographic stereogram, as shown in FIG. 10B, its reproduced image 40 is constantly positioned in the vicinity of the hologram surface 2a. Therefore, a clearly reproduced image 40 free from a distortion and blurring can be generated without requiring for the user to observe the image with his/her eyes positioned on the hologram plane 2a as described above.

Figure 11:
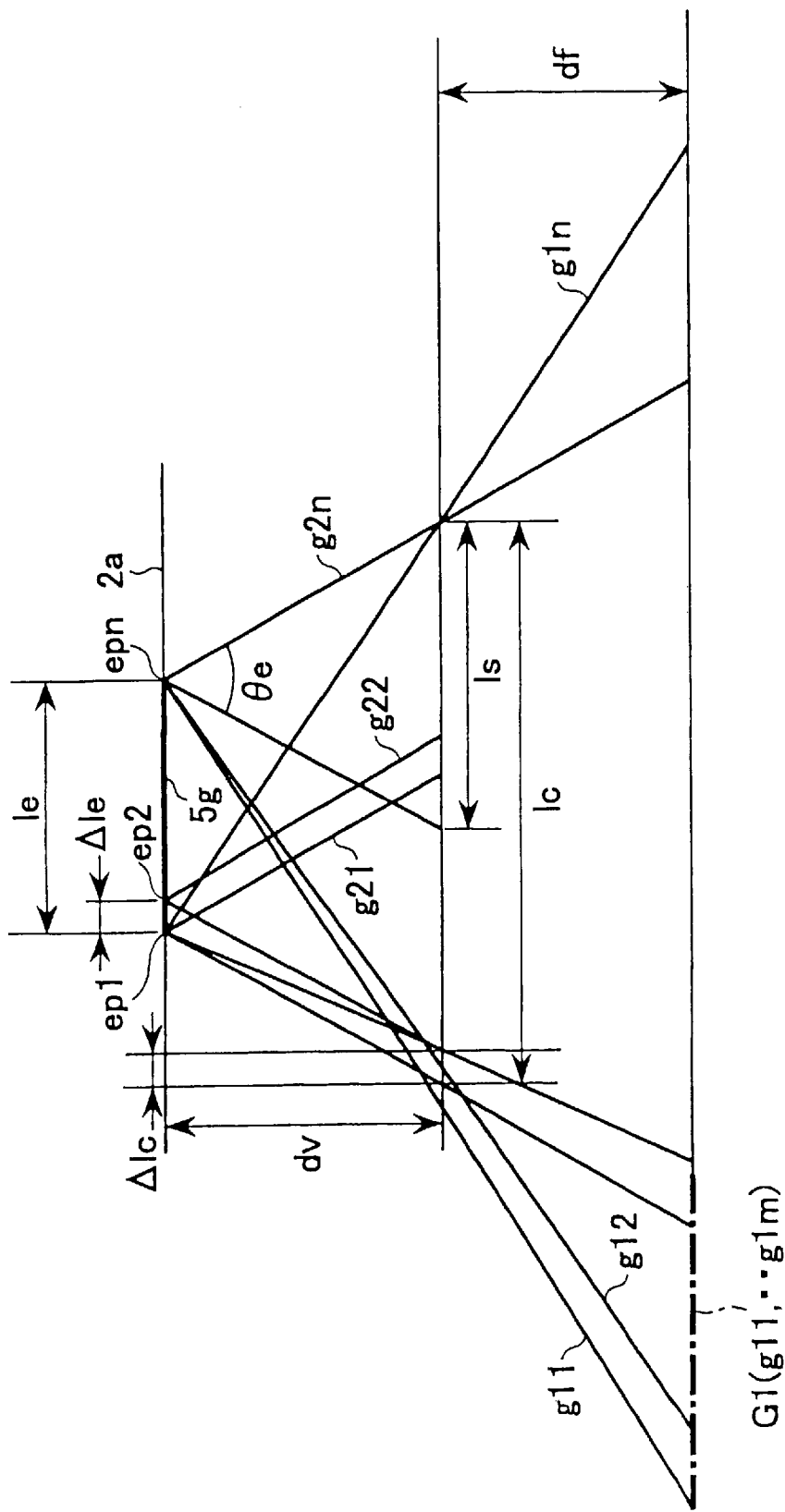
FIG. 11 is a diagram for specifically explaining contents of the viewing point conversion processing of the invention.
Figure 12:
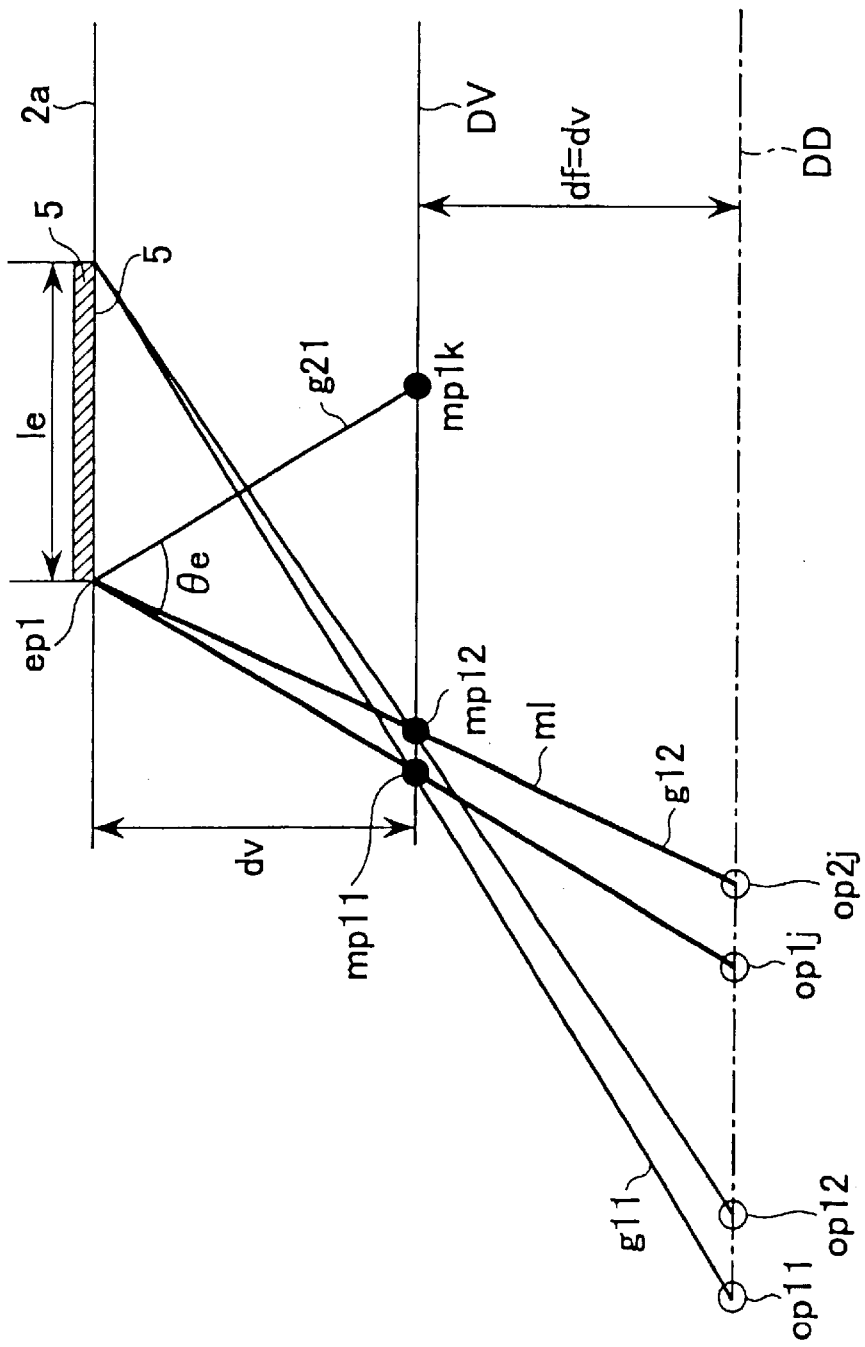
FIG. 12 is a diagram for explaining a relation corresponding between an element parallax image and an element display image in the viewpoint conversion processing.

FIGS. 11 and 12 are diagrams for explaining a principle of the viewing point conversion processing for reconstructing a light exposure image data D2 from a parallax image string data D1 based on a parallax image string G1 including a series of m pieces of element parallax images g1 (g11, g12, ... g1m) which are produced by a re-centering shooting method. The light exposure image data D2 generates a light exposure image G2 including a series of n pieces of element light exposure images g2 (g21, g22, ... G2n) to be displayed on the liquid crystal display. The holographic stereogram printing system which is provided with the image data processing computer displays the element light exposure images g2 based on the light exposure image data subjected to the viewing point conversion processing sequentially on the liquid crystal display so that an element hologram recording image 5g be recorded on the hologram recording medium.

FIG. 11 is a diagram for explaining a positional relationship between each element light exposure image g2 in the light exposure images G2 for exposing/recording each element hologram recording image 5g at each light exposure point ep (ep1, - - - , epn) on the hologram surface 2a of the holographic stereogram 2 having a length le in a parallax direction (horizontal direction) and each element parallax image g1 of parallax image string G1. At each light exposure point ep, the element light exposure image g2 is exposed at a viewing distance dv and an exposure angle of θe. For simplicity of explanation, each of the above-mentioned light exposure points ep is indicated only at ep1, ep2 and epn. Depending on its lateral size (length in the horizontal direction) le of the holographic stereogram 2 and a specified display resolution of the hologram recording image 5, the number of these light exposure points ep must be varied, however, it is assumed here that the number n be approximately 500 with an equi-pitch of 0.2 mm.

A pitch $\Delta$le of each light exposure point ep is identical to a pitch of each element light exposure image g2, and there holds the following equation;

$$le = n \times \Delta le \qquad (1)$$

Further in FIG. 11, a distance 1c is a shooting width at shooting the parallax image string G1 including element parallax images g1 to the number of m, a distance dv is a viewing distance, and a shooting distance df is a distance for shooting the parallax image string G1. By the way, the pitch Δle of each light exposure point ep and a shooting width Δlc of each element parallax image g1 are not always equal to each other. The viewing distance dv and the shooting distance df are equal. At each light exposure point ep on the holographic stereogram 2, there is exposed and recorded each element light exposure image g2 which is displayed sequentially on the liquid crystal display 24 at an exposure angle θe. Each element light exposure image g2 has an image size corresponding to its resolution, for example, 640 pixels in a vertical direction and 480 pixels in a horizontal direction.

The viewing point conversion processing is an image data processing for reconstructing a new light exposure image data D2 so as to generate the element light exposure images g2 to the number of n by interchanging the element parallax image data d1 to the number of m in the parallax image string G1. In the viewing point conversion processing, the interchange of the element parallax image data d1 is performed by a minimum unit of the element image in a slit form with 640 pixels in the vertical direction and 1 pixel in the horizontal direction. This element image data is taken out from the element parallax image data d1 to the number of m so as to construct the element light exposure image g2 with an image size of 640 pixels in the vertical direction and 480 pixels in the horizontal (parallax) direction.

Further, with reference to FIG. 12, the viewing point conversion processing will be described more in details. In FIG. 12, a single element light exposure image g21 in FIG. 11 is taken as a sample to show a condition of reconstruction of its image. The element light exposure image g21 is reconstructed by computing for respective image data at respective sampling points mp11, mp12, - - - mp1k at the viewing point distance dv to be mapped from which element parallax image data d1 based on which element parallax image g1 in the parallax image string G1 having been shot.

In the mapping, mapping lines connecting between light exposure point ep1 and respective sampling points mp11, mp12, - - -, mp1k of the light exposure image g21 and extending below are considered. Its parallax image is selected from the parallax image string G1, which has the closest viewpoint to an intersection of this mapping line m1 with the plane DV at the viewing distance dv, i.e., mp11, mp12, - - -, mp1k, respectively. By the way, in this drawing, for simplification of explanation, the viewpoint of the parallax image string G1 and the sampling point are shown to be fully in agreement with each other, however, it should be noted that depending on the setting of parameters for shooting the parallax image string G1 and parameters of the holographic stereogram 2 to be formed, they do not always coincide with each other. The number of sampling (the number of pixels) k in the parallax direction is k=480 because the light exposure image g21 has the pixel size of 640 pixels in the vertical direction and 480 pixels in the horizontal direction.

For a sampling point mp11, an element parallax image having the closest viewpoint, namely, the element parallax image g11 which has its viewpoint at mp11 is selected, then a parallax data of 640 pixels in the vertical direction and one pixel in the horizontal direction present at a point op1j on a screen plane DS, at which a mapping line m11 (shown in a thick solid line) which is drawn connecting between the exposure point ep1 and the viewing point mp11 of the element parallax image g11 and extending toward the screen of the element parallax image g11 intersects with the screen plane DS at a shooting distance df, is sampled for mapping at the point mp11. By the way, op denotes a sampling point in the parallax image string G1 having been shot, and there exist sampling points to the number of j in each parallax image. For example, there exist sampling points op11, op12, - - -, op1j in the element parallax image g11. Because each element parallax image g1 is shot in an image size of 640 pixels vertically and 480 pixels horizontally, j equals 480.

The above-mentioned image data processing for the viewing point conversion processing is also performed on the other sampling points mp12, - - -, mp1k, thereby enabling to reconstruct a new light exposure image g21 from the parallax image string G1. The viewing point conversion processing, further by performing the same image data processing likewise on the other exposure points ep12, - - -, ep1j, reproduces respective element light exposure images g22, g23, - - - , g2n sequentially for respective exposure points ep. These light exposure image string G2 having been reconstructed are displayed sequentially on the liquid crystal display 24, and the object laser beam L2 having transmitted therethrough interferes with the reference laser beam L3 and is sequentially exposed and recorded on the hologram recording medium 1 as an element hologram record image 5g in the form of a slit.

The holographic stereogram 2 which is produced by applying the above-mentioned viewing point conversion enables its viewing point to shift from the hologram surface 2a toward the observer by a distance dv, thereby shifting a reproduced image 40 of the hologram recorded image 5 toward the observer by the distance dv accordingly, as a result, as shown in FIG. 10B, the reproduced image 40 is constantly positioned in the vicinity of the hologram surface 2a. Thereby, the holographic stereogram 2, when observed at the viewing distance dv, ensures for a high precision reproduced image 40 free of the spatial distortion and blurring to be observed.

In the next, the printer device 30 will be described more specifically. The printer device 30 is provided with an output computer portion and a printer portion for receiving the above-mentioned various processed image data stored in the image storage server 20 and for printing the holographic stereogram. A described before, the printer device 30 can be provided separately from the image processing server 10 and the image storage server 20. The processed image data can be received via any possible data transfer format, including via the Internet, via a recoding medium or the like.

Figures 13A, 13B:
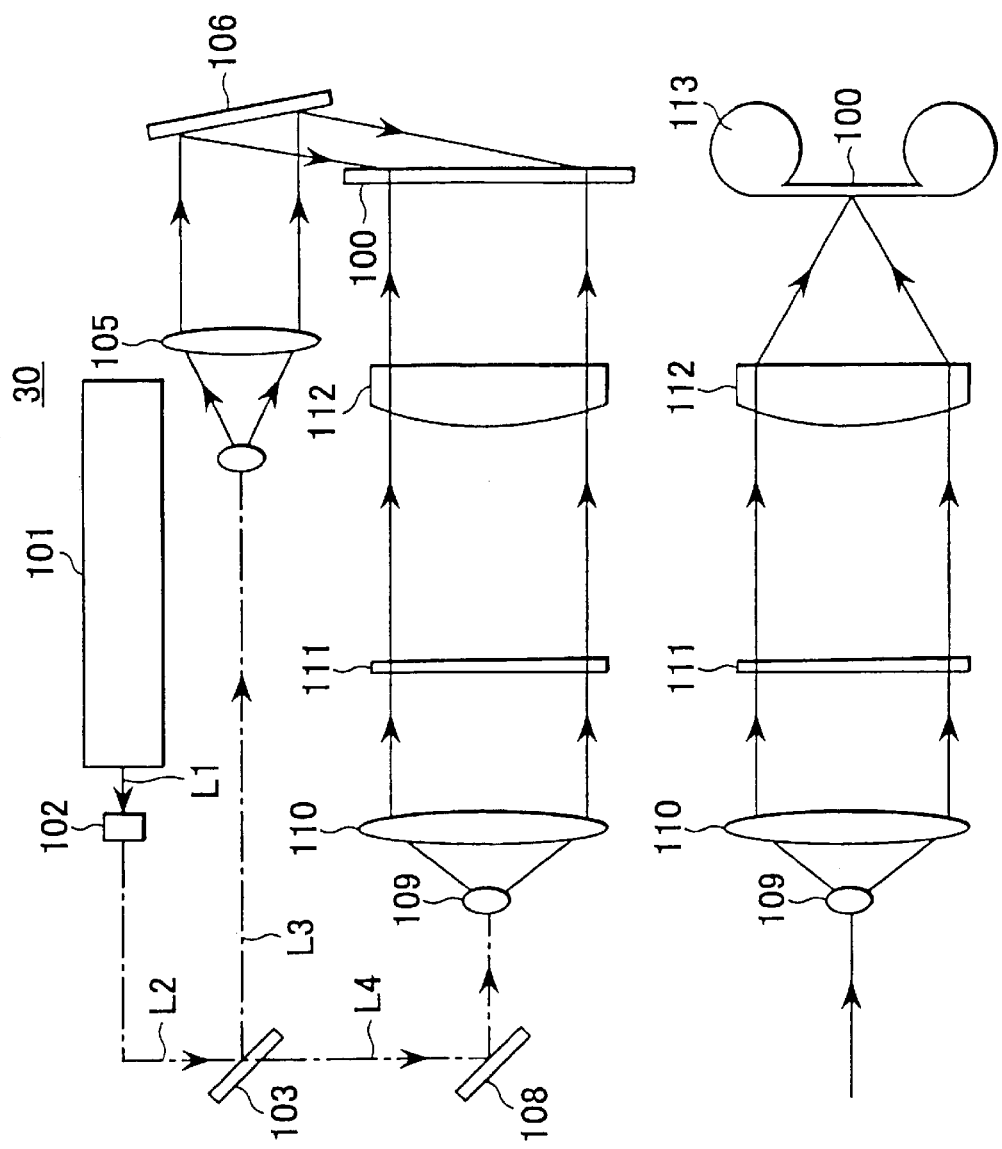
FIGS. 13A and 13B are schematic block diagrams each indicating an arrangement of an optical system in a printout apparatus that constitutes the holographic stereogram printing system of the present invention.
Figure 14:
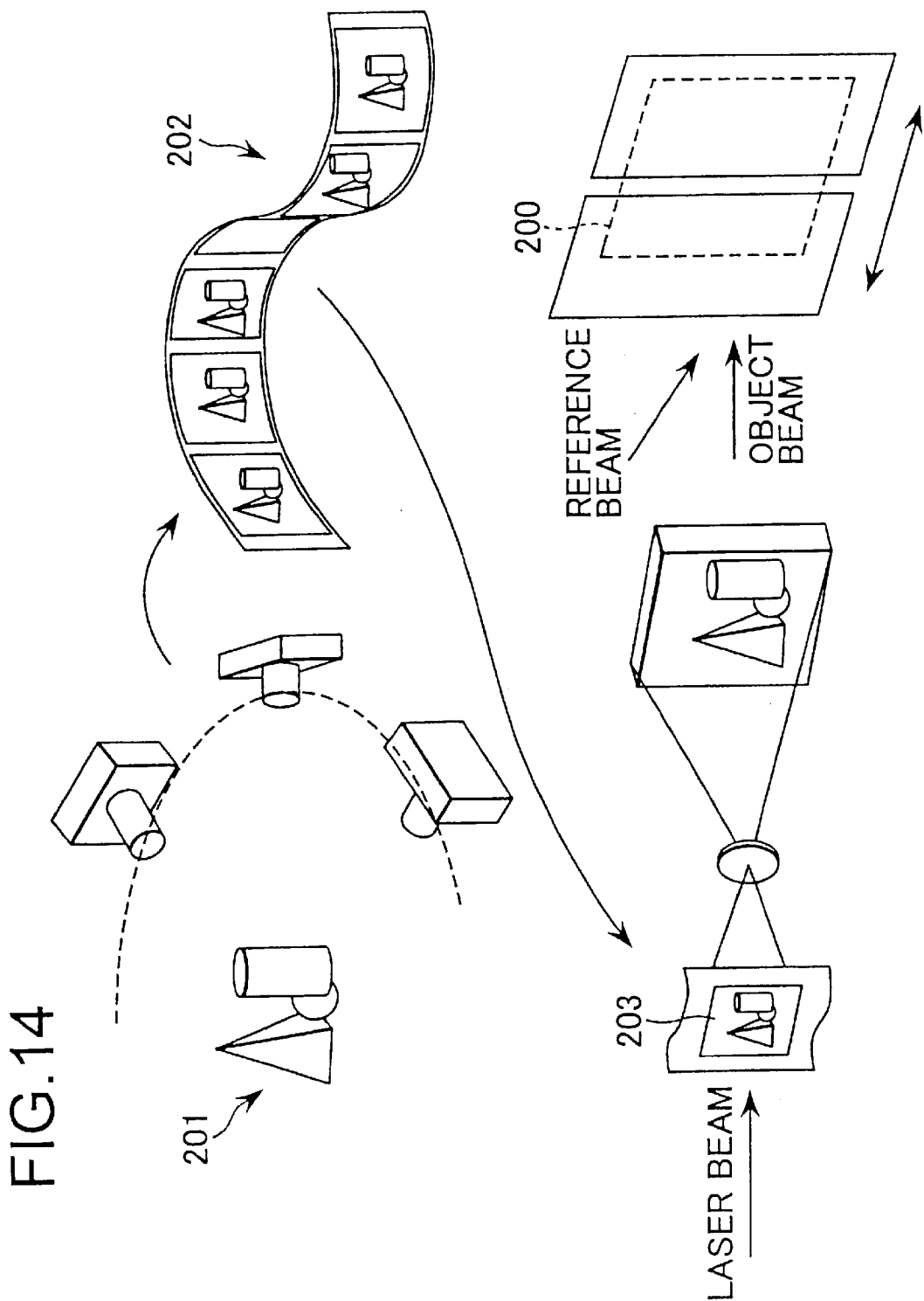
FIG. 14 is a diagram illustrating a process of forming a holographic stereogram.

An optical system of the printer portion in the printer device 30 is shown in FIGS. 13A–13B. FIG. 13A is a plan view of an entire optical system of the printer device 30 while FIG. 13B is a side view of a portion of the optical system for an object beam in the printer device 30.

The printer device 30, as shown in FIG. 13A, has a laser beam source 101 which emits a laser beam of a predetermined wavelength, a light exposure shutter 102 disposed on an optical axis of a laser beam L1 from the laser beam source 101, and a half mirror 103.

The light exposure shutter 102 which is controlled by the output computer portion is closed when a hologram recording medium 100 is not exposed, and is opened when the hologram recording medium 100 is exposed. The half mirror 103 is provided for splitting a laser beam L2 having passed the exposure shutter 102 into a reference beam and an object beam, wherein a beam L3 which is reflected on the half mirror 103 becomes the reference beam and a beam L4 which has transmitted through the half mirror 103 becomes the object beam.

Along an optical axis of the beam L3 reflected on the half mirror 103, there are disposed as an optical system for the reference beam a cylindrical lens 104, a collimator lens 105 for collimating the reference beam and a full reflection mirror 106 sequentially in this order of description.

Then, the beam of light reflected on the half mirror 103 is diverged by the cylindrical lens 104, collimated by the collimator lens 105, then reflected on the full reflection mirror 106 so as to impinge on the hologram recording medium 100.

On the other hand, on an optical axis of a beam L4 which is transmitted through the half mirror 103, there are disposed as an optical system for the object beam a full reflection mirror 108 for reflecting the transmitted beam from the half mirror 103, a spatial filter 109 which combines a convex lens and a pin hole, a collimator lens 110 for collimating the object beam, a display device 111 which displays an image of the object to be recorded, and a cylindrical lens 112 for converging the object beam on a hologram recording medium 100 in this order of description.

Then, the beam L4 having transmitted through the half mirror 103 and after reflected on the full reflection mirror 108 is turned from the spot beam from the spot beam source into a diffused light by the spatial filter 109, then collimated by the collimator lens 110, and then enters the display device 111. Here, the display device 111 which is, for example, a transmission type image display device such as a liquid crystal panel, displays an image thereon in accordance with a processed image data sent from the image processing server 10 via the image storage server 20. Then a light having transmitted the display device 111 after having been modulated in accordance with the image displayed on the display device 111 enters the cylindrical lens 112.

Then, the light having transmitted through the display device 111 is converged in a horizontal direction by the cylindrical lens 112, and this converged light enters into the hologram recording medium 100 as the object beam. Namely, in this printer portion, a projection light from the display device 111 enters the hologram recording medium 100 as the object light of incidence in the form of strips.

Here, it is arranged such that the reference beam enters into one main surface of the hologram recording medium 100 while the object beam enters into the other main surface of the hologram recording medium 100. Namely, the reference beam is caused to enter the one of the main surfaces of the hologram recording medium 100 at a predetermined angle of incidence while the object beam is caused to enter the other side of the main surfaces of the hologram recording medium 100 with an optical axis of the object beam aligned substantially perpendicular relative to the hologram recording medium 100. Thereby, the reference beam and the object beam are arranged to interfere with each other on the hologram recording medium 100 thereby generating interference fringes due to this interference, and this interference fringes are recorded on the hologram recording medium 100 as a change in the index of refraction.

Further, this printout portion is provided with a recording medium feed mechanism 113 which under the control of the output computer portion can feed intermittently the hologram recording medium 100. Every time when an image based on the zooming processed data generated in the image processing server 10 is recorded as one hologram element (element hologram) on the hologram recording medium 100, this recording medium feed mechanism 113 feeds intermittently by one hologram element portion, the hologram recording medium 100 which is set in a predetermined state on the recording medium feed mechanism 113 in response to a control signal from the output computer portion. Thereby, the above-mentioned image based on the zooming processed data is sequentially and consecutively recorded as the hologram element on the hologram recording medium 100 in the horizontal direction.

In the printer portion, it is desirable that the length of the optical path of the reference light reflected by the half mirror 103 and entering into the hologram recording medium 100 be substantially equal to that of the object light transmitted through the half mirror 103 and entering into the hologram recording medium 100 via the display device 111. This improves interference between the reference light and the object light and hence the image quality of the holographic stereogram.

Further, in the printer portion, a diffusion plate may be provided on the light path of the object light for improving the image quality of the holographic stereogram. By provision of such diffusion plate, a noise component contained in the object light is scattered to assure uniform light intensity distribution of the object light incident on the hologram recording medium 100 for improving the image quality of the produced holographic stereogram.

However, when arranging the diffusion plate in this manner, a mask having a strip-shaped opening therein corresponding to the shape of the hologram element is preferably arranged between the diffusion plate and the hologram recording medium 100. By arranging such mask, a superfluous portion of the object light diffused by the diffusion plate is masked by the mask thus enabling a holographic stereogram of higher image quality to be produced.

For assuring a viewing angle in the vertical direction for the holographic stereogram in the printer portion, a one-dimensional diffusion plate for diffusing the object light in the vertical direction may be provided on the light path of the object light. By arranging this one-dimensional diffusion plate, the object light may be diffused in the vertical direction, that is, in the major axis direction of the produced hologram element. Thus the holographic stereogram produced has a viewing angle in the vertical direction.

However, if such a one-dimensional diffusion plate is arranged in this manner, a louver film having a fine lattice in the form of a bamboo blind is desirably arrayed between the hologram recording medium 100 and the one-dimensional diffusion plate. By arranging the louver film in this manner, the reference light transmitted through the hologram recording medium 100 can be prevented from being reflected by the one-dimensional diffusion plate to re-enter the hologram recording medium 100.

The holographic stereogram printing system described hereinabove can print the desired holographic stereogram by selectively performing the stereogram character overlaying process, the morphing process, the texture mapping process, and the short album process with respect to the still picture images supplied by the user.

Further, the image processing which the image processing server 10 performs may include a processing to write a planar character on a still picture image entered or on a string of picture images undergone the image processing. In this case, also, it is done by overlaying the planar character on the still picture image. Still further, the image processing server 10 may perform image processing to move, rotate, and zoom the planar or stereogram characters.

Still more, the image processing which the image processing server 10 performs may include a flipping process to turn sheets of still picture images flipping around a vertical axis y. Still further, it may include a rotation processing to rotate the still picture image itself on the plane.

Furthermore, the image processing which the image processing server 10 performs may include a process to write planar characters on a motion picture image entered or on a string of motion picture images subjected to the image processing. Also, in this case, it is carried out by overlaying the planar characters on the motion picture images. Still more, the image processing server 10 may perform such image processing as to move, rotate, or zoom The planar characters or the stereogram characters on the motion picture images.

Further, the above-mentioned various image processing operations may be performed not only on the still picture images but also on the motion picture images alike. In this case, after entering motion picture images to the image processing server 10, and by changing the viewing direction, the user may observe the holographic motion picture images having undergone the above-mentioned various image processing on the holographic stereogram.

Although the invention has been described in its preferred form with a certain degree of particularity, obviously many changes, variations and combinations are possible therein. It is therefore to be understood that any modifications will be practiced otherwise than as specifically described herein without departing from the scope of the present invention.

What is claimed is:

1. A holographic stereogram printing apparatus, comprising:

generating means for generating a parallax image string while performing visual effect processing on an inputted picture image;

viewpoint conversion processing means for performing a viewpoint conversion processing on said parallax image string;

image storage means for storing therein picture images processed in said viewpoint conversion processing means; and a printer for producing a holographic stereogram in accordance with said processed images read out from said image storage means.

2. A method of printing a holographic stereogram, comprising the steps of:

generating a parallax image string while performing visual effect processing on an inputted picture image;

performing viewpoint conversion processing on said parallax image string;

storing picture images processed at said viewpoint conversion step in image storage means; and printing a holographic stereogram in accordance with said processed picture images read out from said image storage means.

3. The holographic stereogram printing apparatus as claimed in claim 1, wherein said visual effect processing is performed in response to a selection thereof.

4. The holographic stereogram printing apparatus as claimed in claim 1, wherein said inputted picture image includes a picture image provided by a user.

5. The holographic stereogram printing method as claimed in claim 2, wherein said visual effect processing is performed in response to a selection thereof.

6. The holographic stereogram printing method as claimed in claim 2, wherein said inputted picture image includes a picture image provided by a user.

* * * * *